Nov. 25, 1958     S. RUBEN     2,862,156
DRY CAPACITOR
Filed Sept. 14, 1954
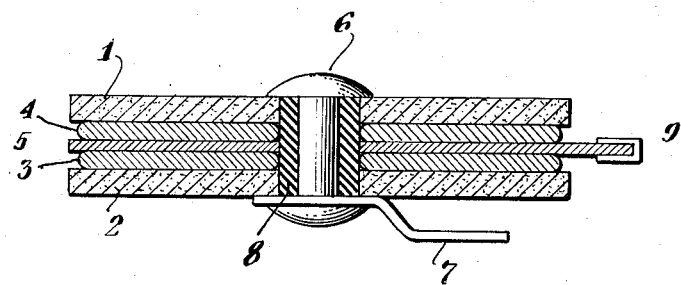
INVENTOR
Samuel Ruben
BY
ATTORNEY

United States Patent Office 2,862,156
Patented Nov. 25, 1958

2,862,156

DRY CAPACITOR

Samuel Ruben, New Rochelle, N. Y.

Application September 14, 1954, Serial No. 455,873

10 Claims. (Cl. 317—230)

This invention relates to dry capacitors, specifically to capacitors employing film forming electrodes, such as tantalum.

An object of the invention is to provide an improved high capacity condenser employing dry solid elements.

A specific object is the provision of improved tantalum capacitors which are free of liquid electrolyte, which are rugged, which may be operated over a wide range of temperature, and which may be simply and economically manufactured.

Further objects will be apparent from the disclosure and from the single figure of the drawing which illustrates a vertical sectional view of a tantalum capacitor embodying the invention.

Broadly, the invention comprises a capacitor having one or more film forming electrodes, such as tantalum, in intimate contact with a sulfate, such as tin, bismuth or antimony sulfate.

I have found that the characteristics of tin sulfate are such as to provide a low resistance electrolytically conductive element which, in contact with an anodized element of a metal such as tantalum, allows the provision of an electrolytic capacitance without the presence of an aqueous electrolyte.

In a preferred combination for use as a direct current condenser, an anodized disc of tantalum is held in pressure contact with a disc of tin sulfate (stannous sulfate, $Sn SO_4$), the opposite surface of which is in contact with an inert non-film forming electrode such as graphite. Tin sulfate is the preferred solid ionic conductor and film maintaining element. Although not as desirable, the hygroscopic sulfates such as bismuth or antimony sulfate can be used in some applications under specially controlled conditions.

Tantalum is the preferred anode material, but other suitable film forming metals may be used. For the cathode, graphite may be used as well as silver or silver coated metals or cast non-porous silicon.

Tantalum directly forms a polarizing layer when connected as the anode in contact with tin sulfate; alternatively the tantalum may be anodized prior to assembly in a suitable aqueous solution, such as sulfuric acid.

In order to obtain maximum capacitance from tantalum, which is expensive, it is preferable to use both sides, as by clamping it between two tin sulfate discs. The capacitance of the tantalum may be increased by etching electrolytically in an acid fluoride salt.

In order to describe an embodiment of the invention in detail, reference is made to the accompanying drawing in which non-porous graphite discs 1 and 2 are in contact with tin sulfate discs 3 and 4, which contact opposite sides of anodized tantalum disc 5. In the preparation of the tin sulfate elements, a pressure of 20,000 lbs. per square inch is applied in order to obtain hard and strong discs. The elements are mounted on rivet 6 which is insulated from the elements by plastic sleeve 8 of polyethylene or a higher temperature inert insulator, if desired. Negative terminal 7 is placed under the rivet to provide contact with the graphite discs, the positive terminal being provided by a tab extending from the tantalum disc and on which is pressed a solderable metal element 9 to facilitate connecting in a circuit. After the unit is assembled, the rivet is pressed to firmly bind the assembly together.

In order to avoid atmospheric moisture effects, the entire assembly can be dipped in a silicone varnish and barked hard, or covered with a plastic casting of an epoxy resin. Other suitable enclosures may also be employed.

The capacitance of the unit is equivalent to that obtained from tantalum in an aqueous electrolyte.

The structure illustrated in the drawing is shown merely as an example and the units may be constructed in various forms. Very low series resistance can be obtained by pressing the tin sulfate into a glass fibre or plastic screen at high pressure to provide a very thin element. For some applications, the cathode may be in the form of a cup of cast non-porous commercial silicon which also serves as the cell container.

For alternating current operation, the capacitors are constructed with two film forming electrodes of equal area in contact with the sulfate.

The polarized cell described herein while particularly suitable as a capacitor, may be employed in other applications where its asymetrically conductive characteristics can be used to advantage.

I claim:

1. A dry capacitor comprising an anodized metal in intimate contact with a solid ionically conductive sulfate selected from the group consisting of stannous sulfate, antimony sulfate and bismuth sulfate.

2. A polarized cell comprising tantalum having a dielectric film formed thereon in intimate contact with solid stannous sulfate.

3. An asymetrically conductive couple comprising anodized tantalum and solid stannous sulfate.

4. A dry capacitor comprising a plate of anodized tantalum in contact with one face of a plate of solid stannous sulfate, and a conductive plate of a material inert to the stannous sulfate in contact with the other face thereof.

5. A dry capacitor comprising a film forming metal such as tantalum and having an anodized surface, a layer of solid stannous sulfate, one face thereof being in contact with said anodized surface, the opposite face being in contact with an electrode of carbon.

6. A dry capacitor comprising an anode of tantalum having a dielectric film thereon, an inert cathode, and a film-maintaining electrolyte composed of an ionically conductive solid sulfate selected from the group consisting of stannous sulfate, antimony sulfate and bismuth sulfate interposed between and in contact with said anode and cathode.

7. A dry capacitor comprising an anode of tantalum having a dielectric film thereon, an inert cathode, and a film-maintaining electrolyte composed of ionically conductive solid stannous sulfate interposed between and in contact with said anode and cathode.

8. A dry capacitor comprising an anode of tantalum having a dielectric film thereon, an inert cathode, and a film-maintaining electrolyte member interposed between and in contact with said anode and cathode, said electrolyte member comprising an inert reticular spacer plate and particles of an ionically conductive solid hydrolizable sulfate selected from the group consisting of stannous sulfate, antimony sulfate and bismuth sulfate compressed in the openings of said spacer plate.

9. A dry capacitor comprising two anodized metal electrodes in intimate contact with a solid ionically conductive sulfate selected from the group consisting of stannous sulfate, antimony sulfate and bismuth sulfate.

10. The dry capacitor of claim 9, in which the anodized metal electrodes are constituted by tantalum having a dielectric film formed thereon.

References Cited in the file of this patent

UNITED STATES PATENTS

| | | |
|---|---|---|
| 368,608 | Peyrusson | Aug. 23, 1887 |
| 1,658,914 | Barhoff | Feb. 14, 1928 |
| 1,668,863 | Morrison | May 8, 1928 |
| 1,714,319 | Ruben | May 21, 1929 |
| 1,798,287 | Ward | Mar. 31, 1931 |
| 2,616,953 | Booe | Nov. 4, 1952 |
| 2,710,369 | Booe | June 7, 1955 |

FOREIGN PATENTS

| | | |
|---|---|---|
| 644,501 | France | Oct. 9, 1928 |